(12) United States Patent
Chen

(10) Patent No.: US 11,484,983 B2
(45) Date of Patent: Nov. 1, 2022

(54) AXIAL MACHINING TOOL AND DUST BLOWER NUT THEREOF

(71) Applicant: Shin-Yain Industrial Co., Ltd., Taichung (TW)

(72) Inventor: Pen Hung Chen, Taichung (TW)

(73) Assignee: Shin-Yain Industrial Co., Ltd., Taichung (TW)

( * ) Notice: Subject to any disclaimer, the term of this patent is extended or adjusted under 35 U.S.C. 154(b) by 177 days.

(21) Appl. No.: 17/142,284

(22) Filed: Jan. 6, 2021

(65) Prior Publication Data
US 2022/0040808 A1 Feb. 10, 2022

(30) Foreign Application Priority Data
Aug. 4, 2020 (TW) .................................. 109210035

(51) Int. Cl.
| | |
|---|---|
| B23B 31/20 | (2006.01) |
| B23Q 11/00 | (2006.01) |
| F04D 29/26 | (2006.01) |
| F04D 29/34 | (2006.01) |
| F04D 29/60 | (2006.01) |

(52) U.S. Cl.
CPC ............ B23Q 11/005 (2013.01); B23B 31/20 (2013.01); F04D 29/263 (2013.01); F04D 29/34 (2013.01); F04D 29/601 (2013.01); B23B 2260/106 (2013.01); B23B 2270/30 (2013.01)

(58) Field of Classification Search
None
See application file for complete search history.

(56) References Cited

U.S. PATENT DOCUMENTS
2016/0067790 A1 * 3/2016 Short ...................... B23B 31/02
408/17

FOREIGN PATENT DOCUMENTS
| | | | | |
|---|---|---|---|---|
| DE | 102004029047 A1 * | 1/2006 | ........... | B23B 31/008 |
| JP | 2010151219 A * | 7/2010 | | |

* cited by examiner

*Primary Examiner* — Michael Lebentritt
(74) *Attorney, Agent, or Firm* — Alan D. Kamrath; Karin L. Williams; Mayer & Williams PC

(57) ABSTRACT

An axial machining tool includes a cutter holder, a collet, a dust blower nut, and a cutter. The cutter holder has a receiving groove. The collet is extended into the receiving groove and has a containing space. The dust blower nut is sleeved on the collet and has a body, at least one blade, and a positioning element. The body has a threaded hole, a connecting groove, and at least one engaging groove. The threaded hole and the connecting groove are formed in the body and communicate with each other. The at least one engaging groove is formed on the body. The at least one blade is detachably mounted in the at least one engaging groove. The positioning element is mounted to the body and positions the at least one blade on the body. The cutter is extended into the containing space. A dust blower nut is also provided.

20 Claims, 8 Drawing Sheets

AXIAL MACHINING TOOL AND DUST BLOWER NUT THEREOF

BACKGROUND OF THE INVENTION

1. Field of the Invention

The present invention relates to a machining tool and a component thereof, and more particularly to an axial machining tool and a dust blower nut thereof.

2. Description of Related Art

A conventional axial machining tool includes a dust blower nut, a collet, a cutter, and a cutter holder. The dust blower nut of the conventional axial machining tool is made of metal materials and has a body and multiple blades. The body has a threaded hole and a connecting groove. The threaded hole is formed in the body and is adjacent to one of two ends of the body. The connecting groove is formed in the body, communicates with the threaded hole, and is adjacent to the other one of the two ends of the body. Each one of the multiple blades is integrally formed on an outer surface of the body, and the multiple blades are disposed at spaced intervals.

To assemble the conventional axial machining tool, extend the collet into the connecting groove of the body, such that the dust blower nut is sleeved on the collet. Next, insert the cutter into the collet and then make the threaded hole of the body threaded to the cutter holder.

While machining a workpiece with the conventional axial machining tool, the cutter holder is mounted to a spindle of a machine tool, and the conventional axial machining tool is driven by the spindle to rotate at a high speed. Wastes such as iron fillings and sawdust are produced while the workpiece is being machined by the cutter. Since the dust blower nut rotates at a high speed along with the conventional axial machining tool, turbine airflows are generated between every two adjacent blades to raise the wastes, which enables a user to collect the wastes in a convenient way during a machining process.

However, in the process of raising waste such as sawdust, the sawdust tends to scatter around due to its light weight, which makes it hard for the user to collect the waste. As a result, the dust blower nut of the conventional axial machining tool made of metal materials has a limited effect on collecting waste.

To overcome the shortcomings of the conventional axial machining tool and the dust blower nut thereof, the present invention tends to provide an axial machining tool and a dust blower nut thereof to mitigate or obviate the aforementioned problems.

SUMMARY OF THE INVENTION

The main objective of the present invention is to provide an axial machining tool and a dust blower nut thereof.

The dust blower nut in accordance with the present invention includes a body, at least one blade, and a positioning element. The body has a threaded hole, a connecting groove, and at least one engaging groove. The threaded hole is formed in the body and is adjacent to one of two ends of the body. The connecting groove is formed in the body, communicates with the threaded hole, and is adjacent to the other one of the two ends of the body opposite to the threaded hole. The at least one engaging groove is formed on an outer surface of the body. The at least one blade is detachably mounted in the at least one engaging groove of the body. The positioning element is mounted to the body and positions the at least one blade on the body.

The axial machining tool in accordance with the present invention includes a cutter holder, a collet, a dust blower nut, and a cutter. The cutter holder has a receiving groove formed in one of two ends of the cutter holder. The collet is extended into the receiving groove of the cutter holder and has a containing space formed through the collet along an axial direction of the collet. The dust blower nut as mentioned above is sleeved on the collet. The cutter is extended into the containing space of the collet and is surrounded by the receiving groove of the cutter holder. The cutter is tightly clamped in the containing space of the collet after the dust blower nut is threaded to the cutter holder.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
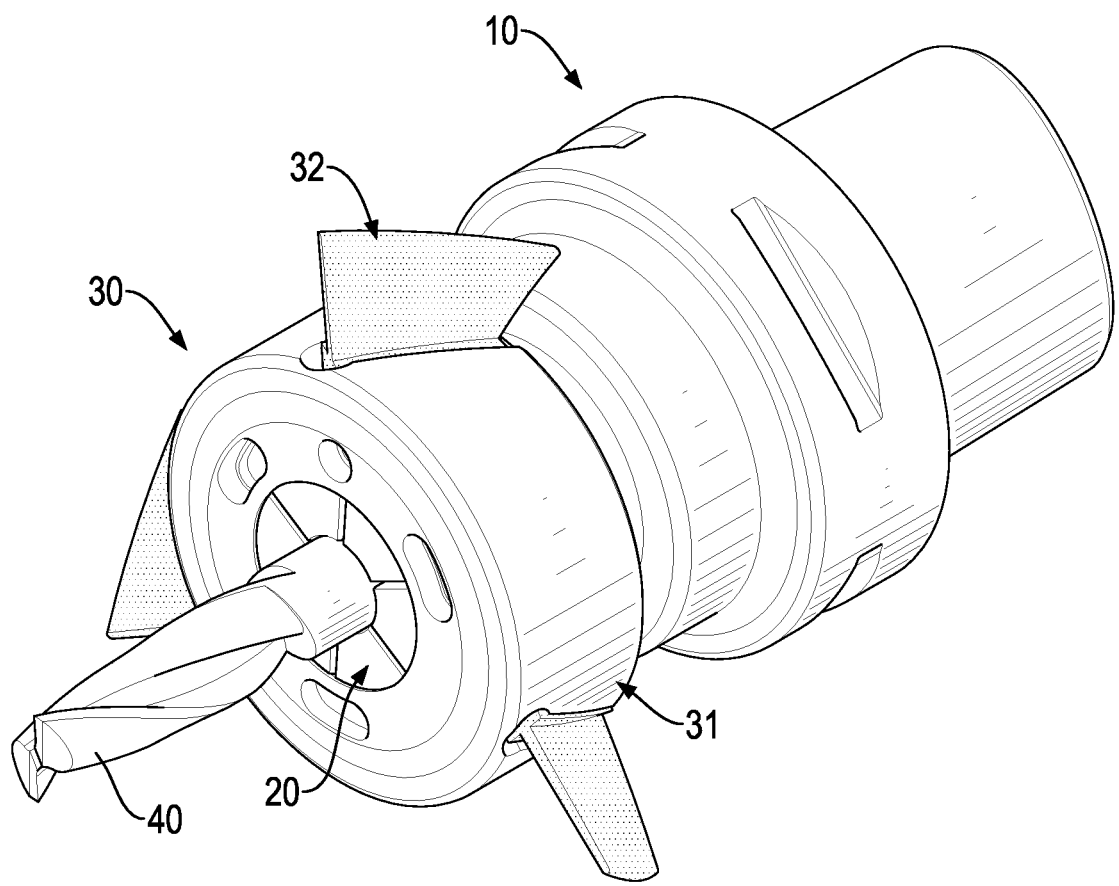
FIG. 1 is a perspective view of a first embodiment of an axial machining tool in accordance with the present invention.
Figure 2:
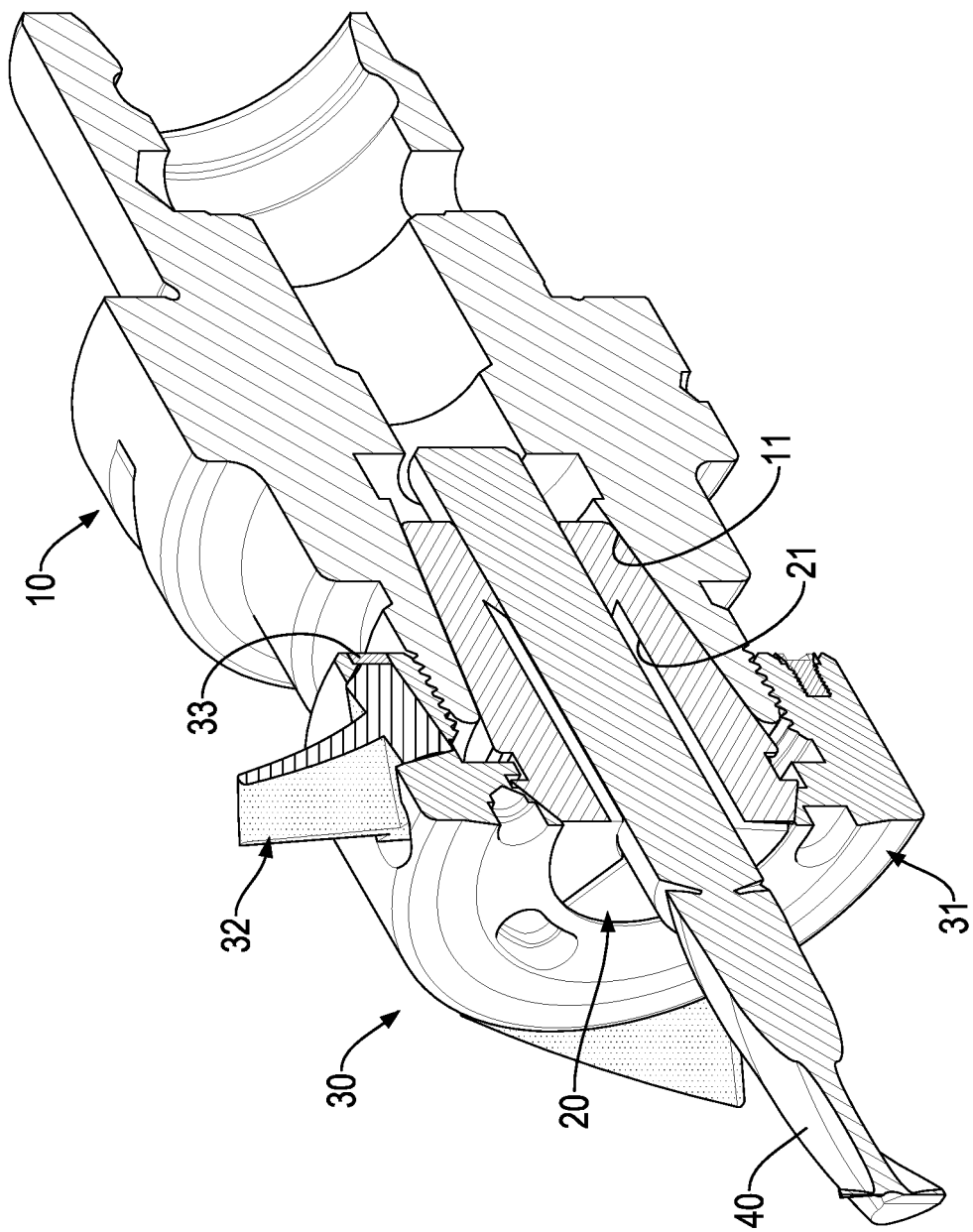
FIG. 2 is a cross-sectional perspective view of the axial machining tool in FIG. 1.
Figure 3:
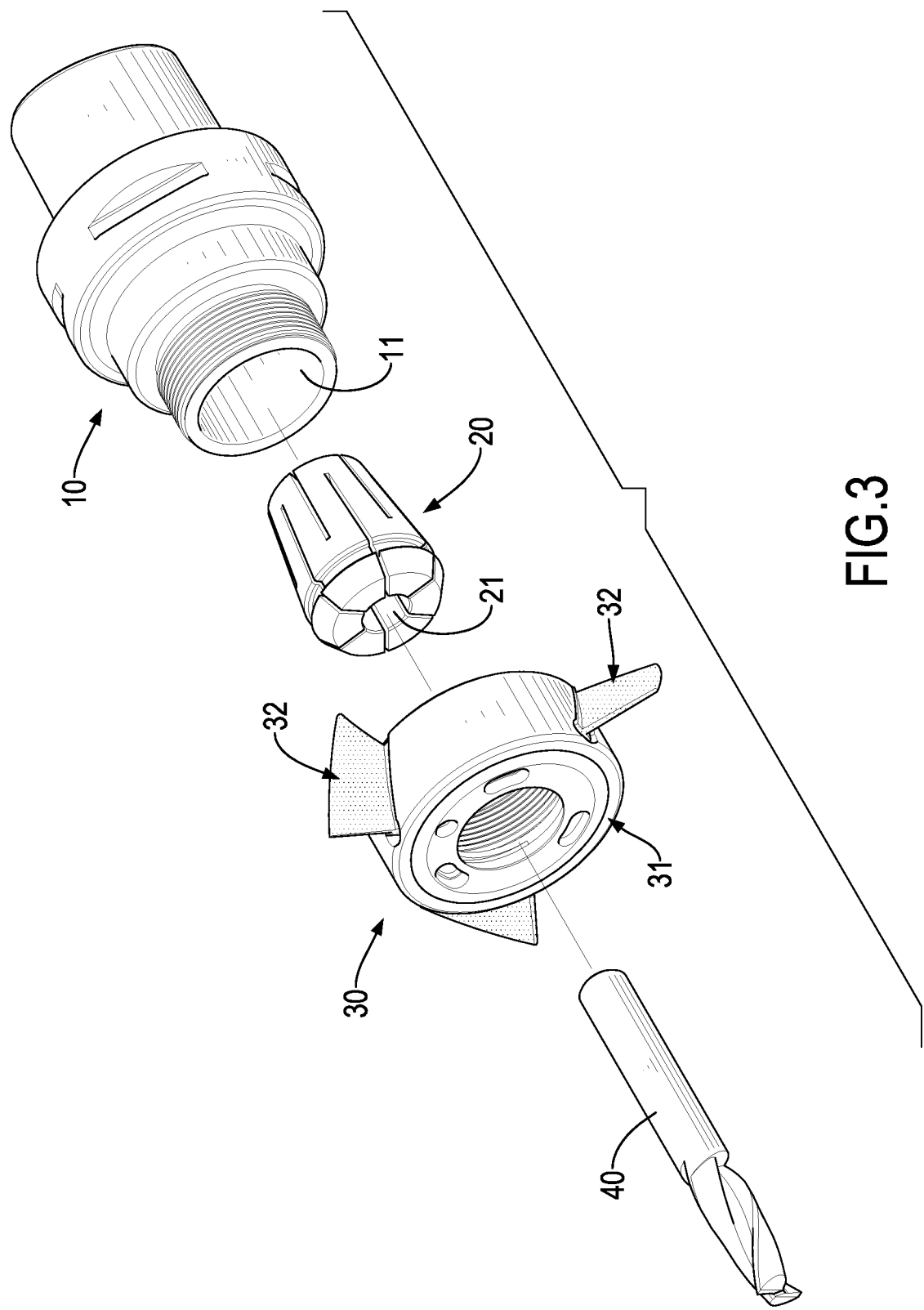
FIG. 3 is an exploded perspective view of the axial machining tool in FIG. 1.

With reference to FIGS. 1 to 3, a first embodiment of an axial machining tool in accordance with the present invention includes a cutter holder 10, a collet 20, a dust blower nut 30, and a cutter 40, wherein the first embodiment of the axial machining tool is applicable for machining a workpiece made of all kinds of materials.

With reference to FIGS. 1 to 3, the cutter holder 10 has a receiving groove 11 formed in one of two ends of the cutter holder 10.

With reference to FIGS. 1 to 3, the collet 20 is extended into the receiving groove 11 of the cutter holder 10, is mounted to the cutter holder 10, and has a containing space 21. The containing space 21 is formed through the collet 20 along an axial direction of the collet 20.

Figure 4:
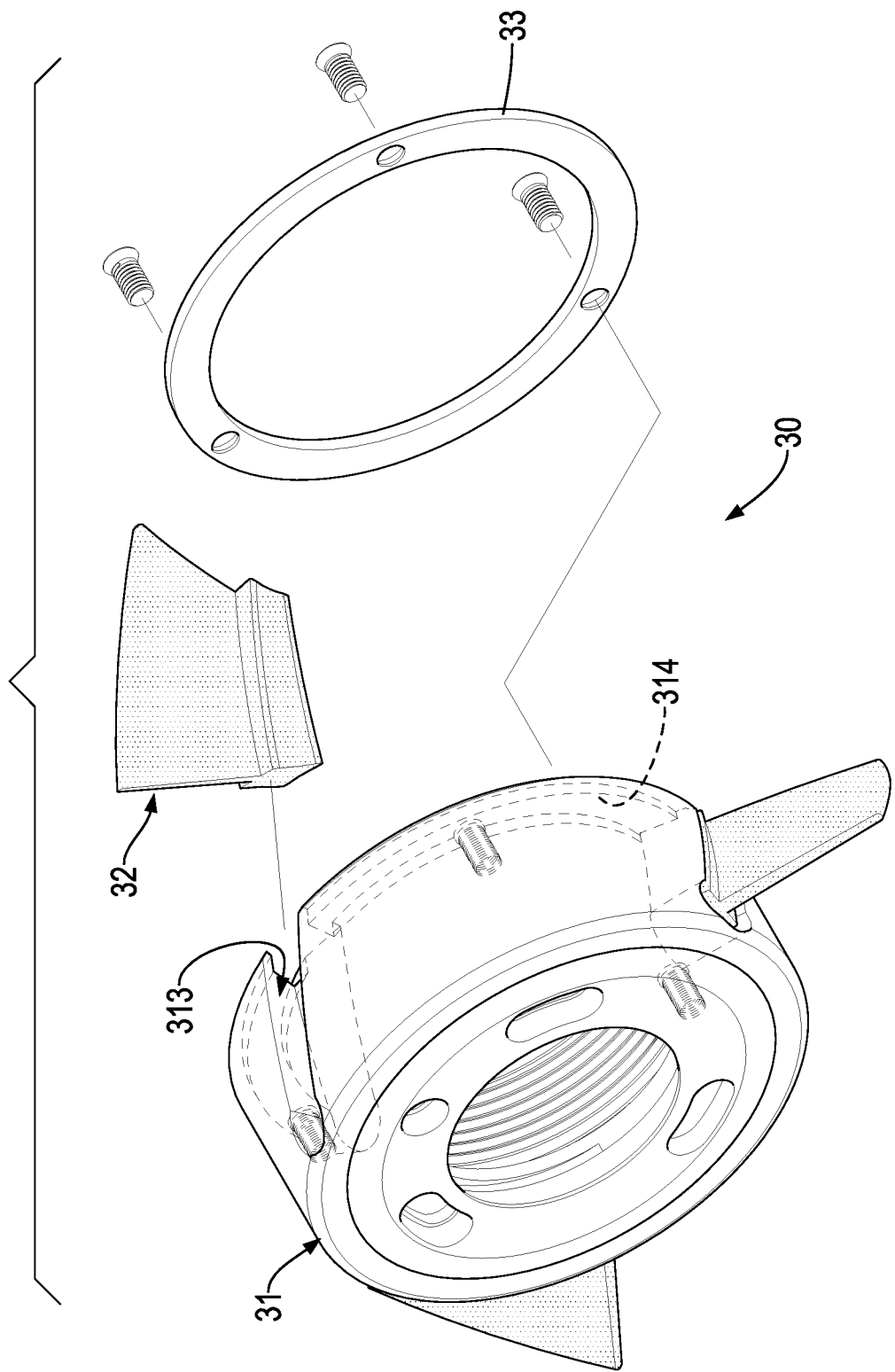
FIG. 4 is an enlarged and exploded perspective view of a dust blower nut of the axial machining tool in FIG. 1.
Figure 5:
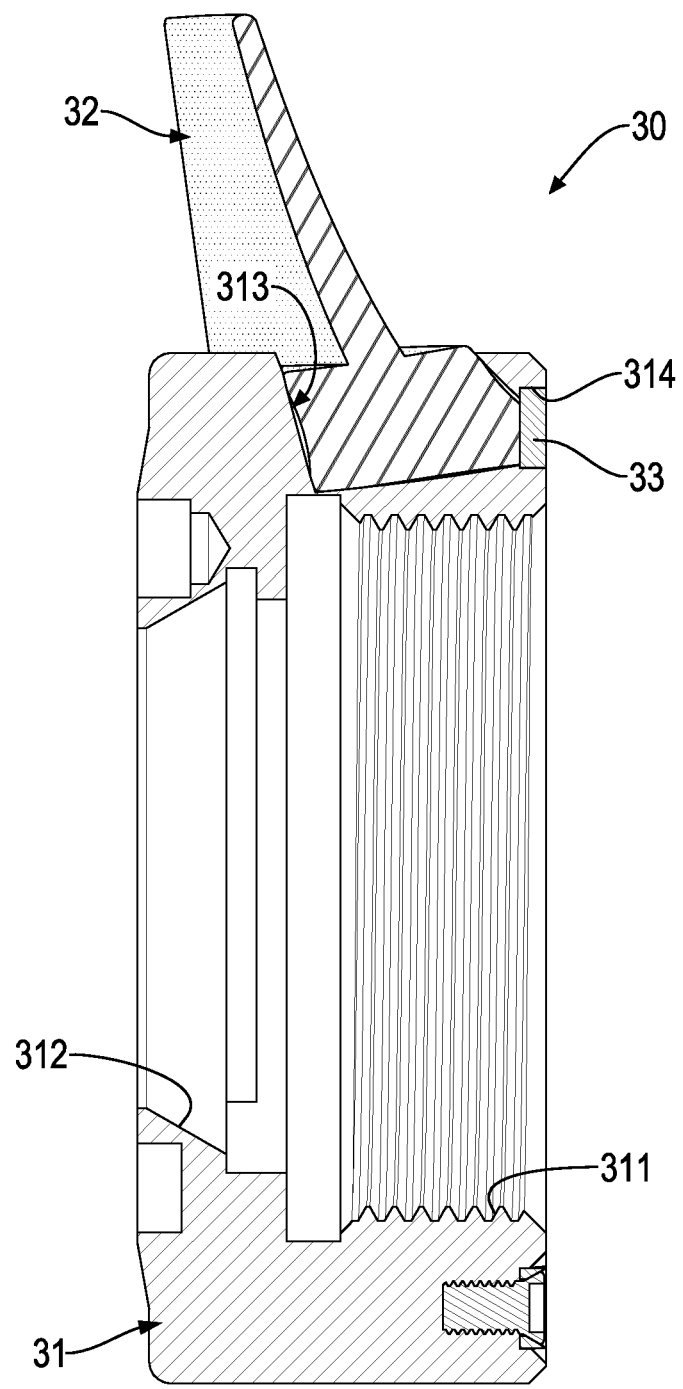
FIG. 5 is a cross-sectional side view of the dust blower nut of the axial machining tool in FIG. 1.
Figure 6:
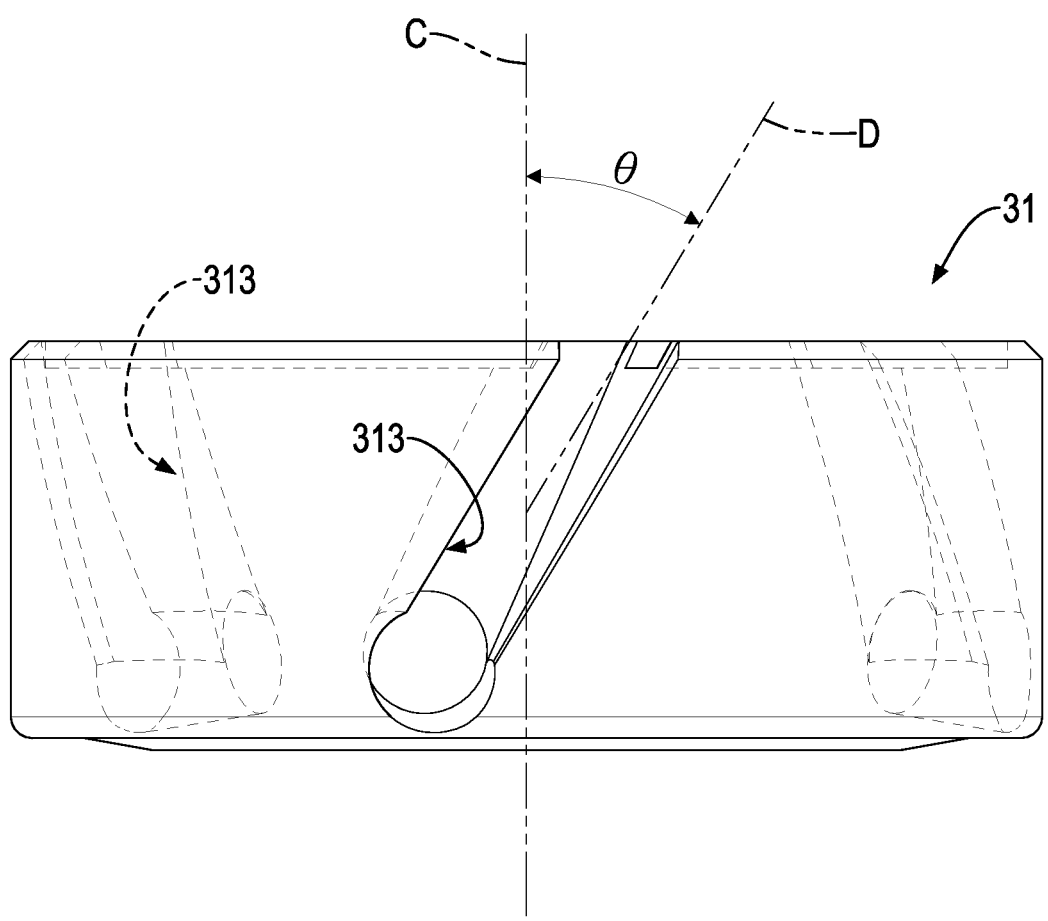
FIG. 6 is a side view of a body of the dust blower nut of the axial machining tool in FIG. 1.

With reference to FIGS. 1 to 3, the dust blower nut 30 is sleeved on the collet 20, is threaded to the cutter holder 10, and has a body 31, at least one blade 32, and a positioning element 33. With reference to FIGS. 5 and 6, the body 31 has a threaded hole 311, a connecting groove 312, at least one engaging groove 313, and a mounting groove 314. The threaded hole 311 is formed in the body 31, is adjacent to one of two ends of the body 31, and allows the body 31 to be threaded to the cutter holder 10. The connecting groove 312 is formed in the body 31, communicates with the threaded hole 311, is adjacent to the other one of the two ends of the body 31 opposite to the threaded hole 311, and has a conical surface formed on its inner surface and being away from the threaded hole 311 to tighten the collet 20. The at least one engaging groove 313 is formed on an outer surface of the body 31. Furthermore, an included angle θ is formed between an extension direction D of the at least one engaging groove 313 and a centerline C of the body 31. With reference to FIGS. 4 and 5, the mounting groove 314 is recessed on one of two end surfaces of the body 31 adjacent to the threaded hole 311, surrounds the threaded hole 311, and communicates with the at least one engaging groove 313.

With reference to FIGS. 4 and 5, the at least one blade 32 is detachably mounted in the at least one engaging groove 313 of the body 31. Since the included angle θ is formed between the extension direction D of the at least one engaging groove 313 and the centerline C of the body 31, an included angle is formed between an extension direction of the at least one blade 32 mounted in the at least one engaging groove 313 and the centerline C of the body 31 so as to cause turbulence in the air adjacent to the at least one blade 32 while the dust blower nut 30 is rotating. In the first embodiment of the axial machining tool, the at least one blade 32 is a single-pieced flexible structure making the at least one blade 32 soft, such that friction between the at least one blade 32 and the at least one engaging groove 313 is avoided. Thus, a user can mount the at least one blade 32 in the at least one engaging groove 313 or detach the at least one blade 32 from the at least one engaging groove 313 conveniently.

With reference to FIGS. 4 and 5, the positioning element 33 is mounted in the mounting groove 314 of the body 31 and can be fixed on the body 31, such that the at least one blade 32 can be pressed on and positioned on the body 31. Moreover, the mounting groove 314 is annular, and the positioning element 33 corresponds to the mounting groove 314 in contour. In the present invention, the body 31 has three engaging grooves 313 formed on the outer surface of the body 31 at spaced intervals, and the dust blower nut 30 has three blades 32 detachably mounted in the three engaging grooves 313 of the body 31 respectively. In such an arrangement, turbine airflows are generated between every two adjacent blades 32 while the dust blower nut 30 is rotating.

With reference to FIGS. 1 and 2, the cutter 40 is extended into the containing space 21 of the collet 20 and is surrounded by the receiving groove 11 of the cutter holder 10. After the dust blower nut 30 is threaded to the cutter holder 10, the cutter 40 can be tightly clamped in the containing space 21 of the collet 20.

Figure 7:
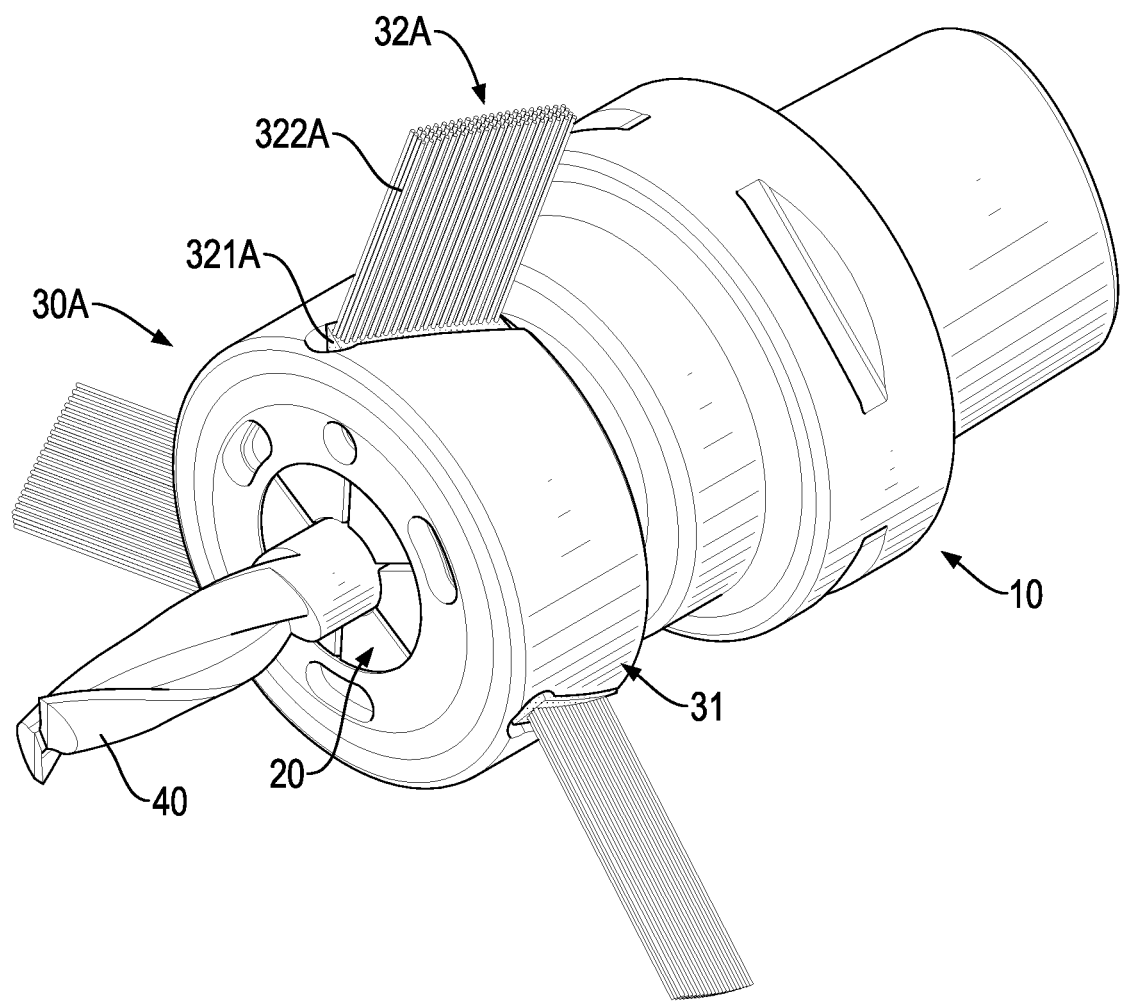
FIG. 7 is a perspective view of a second embodiment of an axial machining tool in accordance with the present invention.
Figure 8:
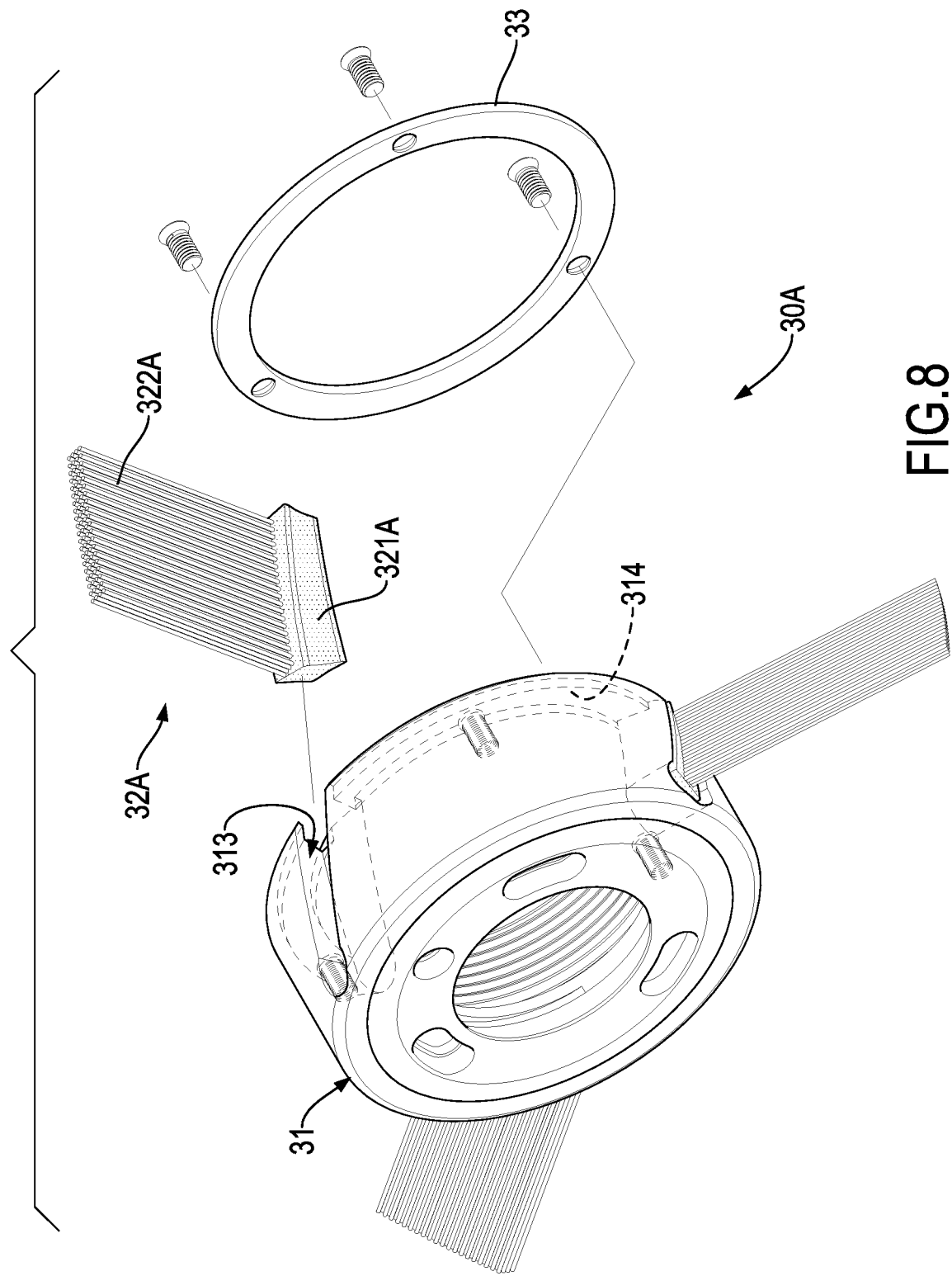
FIG. 8 is an exploded perspective view of a dust blower nut of the axial machining tool in FIG. 7.

With reference to FIGS. 7 and 8, a second embodiment of an axial machining tool in accordance with the present invention is further provided. The second embodiment of the axial machining tool is substantially the same as the first embodiment of the present invention, and the differences between the second embodiment and the first embodiment are that the second embodiment of the axial machining tool is applicable for machining a workpiece made of wood and the at least one blade 32A of the dust blower nut 30A has a connecting portion 321A and a brush portion 322A.

The connecting portion 321A is a flexible structure, and the connecting portion 321A is detachably mounted in the at least one engaging groove 313 of the body 31. The brush portion 322A is disposed on the connecting portion 321A, and the brush portion 322A has multiple bristles extending toward a direction away from the at least one engaging groove 313. Being a flexible structure, the connecting portion 321A of the at least one blade 32A is soft. Hence, the user can mount the at least one blade 32A on the body 31 of the dust blower nut 30A or detach the at least one blade 32A from the body 31 of the dust blower nut 30A in a convenient way by mounting the connecting portion 321A in the at least one engaging groove 313 or detaching the connecting portion 321A from the at least one engaging groove 313.

With reference to FIGS. 4 and 8, to assemble the dust blower nut 30, 30A, mount each one of the at least one blade 32, 32A in each one of the at least one engaging groove 313 of the body 31, and then mount the positioning element 33 in the mounting groove 314 of the body 31 and fix the positioning element 33 on the body 31 to press and position the at least one blade 32, 32A on the body 31. With reference to FIGS. 2, 5, and 7, to assemble the axial machining tool in accordance with the present invention, extend the collet 20 into the receiving groove 11 of the cutter holder 10 and mount the collet 20 into the connecting groove 312 of the body 31 of the dust blower nut 30, 30A. Next, insert the cutter 40 into the containing space 21 of the collet 20 and the receiving groove 11 of the cutter holder 10. Finally, fasten the dust blower nut 30, 30A to the cutter holder 10 to make the cutter 40 clamped in the containing space 21 of the collet 20.

While machining a workpiece with the axial machining tool in accordance with the present invention, the cutter holder 10 is mounted to a spindle of a machine tool, and the axial machining tool of the present invention is driven by the spindle to rotate at a high speed. Wastes such as iron fillings and sawdust are produced while the workpiece is being machined by the cutter 40. Because the dust blower nut 30, 30A rotates at a high speed along with the axial machining tool, turbine airflows are generated between every two adjacent blades 32, 32A to raise the wastes, which enables the user to collect the wastes in a convenient way during a machining process.

With the aforementioned technical characteristics, the axial machining tool in accordance with the present invention has the following advantages.

1. Since each one of the at least one blade 32, 32A of the dust blower nut 30, 30A is detachably mounted in each one of the at least one engaging groove 313 of the body 31, the user can choose to use the at least one blade 32 or the at least one blade 32A according to the materials of which the workpiece is made. If the workpiece is made of wood, the sawdust produced in the machining process tends to scatter around when being raised. In this case, the user can mount the at least one blade 32A having the brush portion 322A in the at least one engaging groove 313 of the body 31. In use, the sawdust is stuck in the multiple bristles of the brush portion 322A of the at least one blade 32A when the sawdust is raised. Compared with the dust blower nut of the conventional axial machining tool having a limited effect on collecting waste such as sawdust, the dust blower nut 30, 30A of the axial machining tool of the present invention raises the efficiency of collecting the sawdust when in use. Furthermore, the user just needs to detach the at least one blade 32A from the body 31 when the user wants to remove the sawdust from the multiple bristles of the brush portion 322A of the at least one blade 32A, such that the user can clean the multiple bristles of the brush portion 322A conveniently.

2. After a long-term use, abrasion on each one of the at least one blade 32, 32A and damage to each one of the at least one blade 32, 32A due to collision of the waste and the at least one blade 32, 32A may occur. Because the at least one blade 32, 32A is detachable, the user can replace the abraded blade 32, 32A or the damaged blade 32, 32A with a new blade 32, 32A. Compared with the dust blower nut of the conventional axial machining tool that should be entirely replaced when abraded or damaged since the multiple blades are integrally formed on the outer surface of the body, the dust blower nut of the present invention has the advantage of lowering the cost in replacement.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dust blower nut comprising:
   a body having
      a threaded hole formed in the body and adjacent to one of two ends of the body;
      a connecting groove formed in the body, communicating with the threaded hole, and adjacent to the other one of the two ends of the body opposite to the threaded hole; and
      at least one engaging groove formed on an outer surface of the body;
   at least one blade detachably mounted in the at least one engaging groove of the body; and
   a positioning element mounted to the body and positioning the at least one blade on the body.

2. The dust blower nut as claimed in claim 1, wherein the at least one blade is a single-pieced flexible structure.

3. The dust blower nut as claimed in claim 1, wherein the at least one blade each has
   a connecting portion being a flexible structure and detachably mounted in the at least one engaging groove of the body; and
   a brush portion disposed on the connecting portion and having multiple bristles extending toward a direction away from the at least one engaging groove.

4. The dust blower nut as claimed in claim 1, wherein
   the body has a mounting groove recessed on one of two end surfaces of the body adjacent to the threaded hole and communicating with the at least one engaging groove; and
   the positioning element is mounted in the mounting groove of the body, such that the at least one blade is pressed on and positioned on the body.

5. The dust blower nut as claimed in claim 2, wherein
   the body has a mounting groove recessed on one of two end surfaces of the body adjacent to the threaded hole and communicating with the at least one engaging groove; and
   the positioning element is mounted in the mounting groove of the body, such that the at least one blade is pressed on and positioned on the body.

6. The dust blower nut as claimed in claim 3, wherein
   the body has a mounting groove recessed on one of two end surfaces of the body adjacent to the threaded hole and communicating with the at least one engaging groove; and
   the positioning element is mounted in the mounting groove of the body, such that the at least one blade is pressed on and positioned on the body.

7. The dust blower nut as claimed in claim 1, wherein
   the body has a centerline;
   the at least one engaging groove has an extension direction; and
   an included angle is formed between the extension direction of the at least one engaging groove and the centerline of the body, such that an included angle is formed between an extension direction of the at least one blade mounted in the at least one engaging groove and the centerline of the body.

8. The dust blower nut as claimed in claim 2, wherein
   the body has a centerline;
   the at least one engaging groove has an extension direction; and
   an included angle is formed between the extension direction of the at least one engaging groove and the centerline of the body, such that an included angle is formed between an extension direction of the at least one blade mounted in the at least one engaging groove and the centerline of the body.

9. The dust blower nut as claimed in claim 3, wherein
   the body has a centerline;
   the at least one engaging groove has an extension direction; and
   an included angle is formed between the extension direction of the at least one engaging groove and the centerline of the body, such that an included angle is formed between an extension direction of the at least one blade mounted in the at least one engaging groove and the centerline of the body.

10. The dust blower nut as claimed in claim 1, wherein
    the body has multiple said engaging grooves formed on the outer surface of the body at intervals; and
    the dust blower nut has multiple said blades detachably mounted in the multiple engaging grooves of the body respectively.

11. The dust blower nut as claimed in claim 2, wherein
    the body has multiple said engaging grooves formed on the outer surface of the body at intervals; and
    the dust blower nut has multiple said blades detachably mounted in the multiple engaging grooves of the body respectively.

12. The dust blower nut as claimed in claim 3, wherein
    the body has multiple said engaging grooves formed on the outer surface of the body at intervals; and
    the dust blower nut has multiple said blades detachably mounted in the multiple engaging grooves of the body respectively.

13. An axial machining tool comprising:
    a cutter holder having a receiving groove formed in one of two ends of the cutter holder;
    a collet extended into the receiving groove of the cutter holder and having a containing space formed through the collet along an axial direction of the collet;
    a dust blower nut sleeved on the collet and having
       a body having
          a threaded hole formed in the body and adjacent to one of two ends of the body;
          a connecting groove formed in the body, communicating with the threaded hole, and adjacent to the other one of the two ends of the body opposite to the threaded hole; and
          at least one engaging groove formed on an outer surface of the body;
       at least one blade detachably mounted in the at least one engaging groove of the body; and a positioning element mounted to the body and positioning the at least one blade on the body; and a cutter extended into the containing space of the collet and surrounded by the receiving groove of the cutter holder;

wherein the cutter is tightly clamped in the containing space of the collet after the dust blower nut is threaded to the cutter holder.

14. The axial machining tool as claimed in claim 13, wherein the at least one blade is a single-pieced flexible structure.

15. The axial machining tool as claimed in claim 13, wherein the at least one blade each has a connecting portion being a flexible structure and detachably mounted in the at least one engaging groove of the body; and a brush portion disposed on the connecting portion and having multiple bristles extending toward a direction away from the at least one engaging groove.

16. The axial machining tool as claimed in claim 13, wherein the body has a mounting groove recessed on one of two end surfaces of the body adjacent to the threaded hole and communicating with the at least one engaging groove; and the positioning element is mounted in the mounting groove of the body, such that the at least one blade is pressed on and positioned on the body.

17. The axial machining tool as claimed in claim 14, wherein the body has a mounting groove recessed on one of two end surfaces of the body adjacent to the threaded hole and communicating with the at least one engaging groove; and the positioning element is mounted in the mounting groove of the body, such that the at least one blade is pressed on and positioned on the body.

18. The axial machining tool as claimed in claim 15, wherein the body has a mounting groove recessed on one of two end surfaces of the body adjacent to the threaded hole and communicating with the at least one engaging groove; and the positioning element is mounted in the mounting groove of the body, such that the at least one blade is pressed on and positioned on the body.

19. The axial machining tool as claimed in claim 13, wherein the body has a centerline;

the at least one engaging groove has an extension direction; and an included angle is formed between the extension direction of the at least one engaging groove and the centerline of the body, such that an included angle is formed between an extension direction of the at least one blade mounted in the at least one engaging groove and the centerline of the body.

20. The axial machining tool as claimed in claim 14, wherein the body has a centerline;

the at least one engaging groove has an extension direction; and an included angle is formed between the extension direction of the at least one engaging groove and the centerline of the body, such that an included angle is formed between an extension direction of the at least one blade mounted in the at least one engaging groove and the centerline of the body.

* * * * *